United States Patent
Gateman et al.

(10) Patent No.: US 8,675,446 B2
(45) Date of Patent: Mar. 18, 2014

(54) OCEAN BOTTOM SEISMIC CABLE RECORDING APPARATUS

(75) Inventors: Jan Gateman, Bekkestua (NO); Ivar Gimse, Oslo (NO)

(73) Assignee: Magseis AS, Lysaker (NO)

( * ) Notice: Subject to any disclaimer, the term of this patent is extended or adjusted under 35 U.S.C. 154(b) by 0 days.

(21) Appl. No.: 13/640,194

(22) PCT Filed: May 6, 2011

(86) PCT No.: PCT/NO2011/000147
§ 371 (c)(1),
(2), (4) Date: Nov. 20, 2012

(87) PCT Pub. No.: WO2011/139159
PCT Pub. Date: Nov. 10, 2011

(65) Prior Publication Data
US 2013/0058192 A1 Mar. 7, 2013

(30) Foreign Application Priority Data
May 7, 2010 (NO) .................................... 20100660

(51) Int. Cl.
*G01V 1/38* (2006.01)

(52) U.S. Cl.
USPC ............................................. 367/20; 367/15

(58) Field of Classification Search
USPC ............... 331/2; 367/15, 20, 50, 79, 154, 159
See application file for complete search history.

(56) References Cited

U.S. PATENT DOCUMENTS

| | | | |
|---|---|---|---|
| 2,283,200 A | 5/1942 | Flude | |
| 2,423,591 A | 7/1947 | Flude | |
| 4,281,403 A | 7/1981 | Siems et al. | |
| 4,780,863 A | 10/1988 | Schoepf | |
| 4,870,625 A | 9/1989 | Young | |
| 4,942,557 A | 7/1990 | Seriff | |
| 5,189,642 A | 2/1993 | Donoho et al. | |
| 5,682,357 A | 10/1997 | Rigsby | |
| 6,024,344 A | 2/2000 | Buckley et al. | |
| 6,070,857 A | 6/2000 | Dragsund et al. | |
| 6,082,710 A | 7/2000 | Dragsund et al. | |

(Continued)

FOREIGN PATENT DOCUMENTS

| | | |
|---|---|---|
| GB | 2 422 670 | 8/2006 |
| WO | 2009/039252 | 3/2009 |
| WO | 2010/025283 | 3/2010 |

OTHER PUBLICATIONS

International Search Report issued Jul. 5, 2011 in International (PCT) Application No. PCT/N02011/000147.

(Continued)

*Primary Examiner* — Isam Alsomiri
*Assistant Examiner* — Daniel L Murphy
(74) *Attorney, Agent, or Firm* — Wenderoth, Lind & Ponack, L.L.P.

(57) ABSTRACT

An ocean bottom seismic cable recording apparatus comprising a plurality of seismic node casings (1), said node casings being separated from each other by separate stress member sections (2), each stress member section having acoustic decoupling arrangements (3) at each end connecting to said seismic node casings (1), and where each seismic node casing comprising an autonomous sensor capsule (5) for sensing and recording seismic data, and wherein the autonomous sensor capsule (5) is removable from said seismic node casing (1), and wherein each seismic node casing (1) further comprising an inner compartment (4) accommodating the autonomous sensor capsule (5).

31 Claims, 8 Drawing Sheets

(56) References Cited

U.S. PATENT DOCUMENTS

| | | |
|---|---|---|
| 6,657,921 B1 | 12/2003 | Ambs |
| 7,310,287 B2 | 12/2007 | Ray et al. |
| 7,483,335 B2 | 1/2009 | Oldervoll et al. |
| 7,649,803 B2 | 1/2010 | Ray et al. |
| 7,724,607 B2 | 5/2010 | Ray et al. |
| 7,804,737 B2 | 9/2010 | Thompson |
| 7,822,515 B2 | 10/2010 | George et al. |
| 7,883,292 B2 | 2/2011 | Thompson et al. |
| 7,990,803 B2 | 8/2011 | Ray et al. |
| 8,050,140 B2 | 11/2011 | Ray et al. |
| 8,087,848 B2 | 1/2012 | Thompson et al. |
| 8,328,467 B2 | 12/2012 | Thompson et al. |
| 8,427,900 B2 | 4/2013 | Fleure et al. |
| 8,446,797 B2 | 5/2013 | Olivier et al. |
| 2006/0227656 A1 | 10/2006 | Berg et al. |
| 2007/0070808 A1 | 3/2007 | Ray et al. |
| 2008/0192569 A1 | 8/2008 | Ray et al. |
| 2008/0239878 A1 | 10/2008 | Berg et al. |
| 2008/0279636 A1 | 11/2008 | Ray et al. |
| 2009/0324338 A1 | 12/2009 | Thompson et al. |
| 2010/0034051 A1 | 2/2010 | Berg et al. |
| 2010/0054078 A1 | 3/2010 | Thompson et al. |
| 2010/0293245 A1 | 11/2010 | Ray et al. |
| 2011/0005801 A1 | 1/2011 | Olivier et al. |
| 2011/0051550 A1 | 3/2011 | Lindberg |
| 2011/0292758 A1 | 12/2011 | Fleure et al. |
| 2012/0099928 A1 | 4/2012 | Thompson et al. |

OTHER PUBLICATIONS

Norwegian Search Report issued Mar. 7, 2011 in Norwegian Patent Application No. 20100660.

Written Opinion of the International Searching Authority issued Jul. 5, 2011 in corresponding International Application No. PCT/NO2011/000147.

OCEAN BOTTOM SEISMIC CABLE RECORDING APPARATUS

INTRODUCTION

The present invention relates to the field of marine seismic exploration. More particularly, the invention relates to an apparatus for marine seismic data acquisition using ocean bottom seismic cables; an ocean bottom seismic cable recording apparatus, a method for deployment of the ocean bottom seismic cable recording apparatus and a method for recovery of an ocean bottom seismic cable recording apparatus.

BACKGROUND

Marine seismic exploration is normally conducted by firing a seismic source towed close to the sea surface by a vessel. The seismic energy is propagating down through the earth and parts of the transmitted energy will return to the surface after being reflected and/or refracted by discontinuities in the sub surface. The discontinuities are formed by interfaces between layers having different elastic properties and are called seismic reflectors. The returned energy is recorded by seismic sensors at the sea bottom or near the sea surface. In marine seismic exploration two main methods are used to record the returning seismic energy. One is by using so called hydrophone cables that are towed behind a vessel. This method only records the pressure waves (P-waves) since the shear waves (S-waves) do not propagate through the water column. The other method is to deploy the seismic sensors at the sea bottom (geophones and hydrophones). By doing so both P-waves and S-waves can be recorded and hence more useful data will be recorded and subsequently processed and used for mapping the sub surface.

During the recent years, there has been an increasing activity in improving the results of marine seismic investigations by collecting seismic signals at the seabed instead of, or as a supplement to, the more usual hydrophone streamer signal acquisition.

We will in the following describe the existing, known methods for acquisition of marine seismic data using sensors located at the sea bottom, so called ocean bottom seismic (OBS).

There are basically two main different OBS techniques that are used at present.

The first technique is to deploy an ocean bottom cable with integrated seismic sensors and electrical and/or optical wiring from the sensors to the sea surface where the seismic data is recorded. The seismic energy is generated by a seismic source deployed and towed by a separate vessel called the source vessel. The seismic cable is normally attached during data recording to the cable deploying vessel or another vessel. Real time recording of all sensors takes place onboard the surface vessel. A typical construction of the cable connecting the different sensors that are spaced along the cable (typically with either 25 or 50 m spacing) consists of electrical wires at the center of the cable with a steel wire armor as an outer skin that function as a stress member. The steel wire armor also protects the cable from tearing during the deployment and recovery. This type of cable is sensitive to water leakage through its multiple electrical terminations. Hence, this method has the weakness of being inherently slow since during the deployment and retrieval one has to take into account that the cable is sensitive to any stretch or bending forces. If the cable suffers from leakage, the cable typically has to be retrieved, repaired and redeployed before the data acquisition can commence. The same applies if the cable breaks. Data acquisition using this type of ocean bottom cables are relatively costly because of the slow cable handling and since the common practice is to use three vessels, one source vessel, one cable laying vessel and one combined cable laying and recording vessel.

In the last couple of years a slightly different approach has been in use whereby the recording vessel has been replaced with a recording buoy that also provides the cable with electrical power generated from either a diesel generator or from batteries located in the buoy. All or part of the recorded data is then transmitted via a radio link from the buoy to either the source vessel or the cable vessel. The second present method that is used is to plant and recover autonomous seismic recording nodes to and from the sea bed using a ROV or by simply to drop the recording nodes overboard and then let them slowly descend to the sea bed. In the latter case the seismic recording nodes are recovered to the surface vessel by transmitting an acoustic signal that trigger a mechanism in each node that activates its floating device or releases the node from an anchorage weight such that the node can slowly float up to the sea surface by itself. Both these methods are very time consuming and hence expensive. These types of recording nodes are typically large and heavy.

Another way of using nodes, which has been applied, is to attach the individual nodes to a flexible rope, drop the nodes with slack in the rope between them and then let them descend to the seabed. After the recording is completed the nodes are recovered by winching up the rope.

U.S. Pat. No. 6,024,344 discloses a method for recording seismic data in deep water whereby a free end of a continuous wire is lowered into the water and seismic recorders are subsequently attached to the wire at selected intervals and thereafter lowered to the sea bottom. The wire can also provide electrical communication for power or signals between adjacent recorders or up to a surface vessel.

U.S. Pat. No. 6,657,921 B1 discloses a system for collecting data from underlying geologic formations whereby housings with a first end having a hydrodynamic shaped profile are deployed in the water and then descending fast to the sea bottom. The housings are reconfigured by a controller when coming in contact with the sea bottom. Each housing can contain a marine seismic sensor that can be disconnected from its housing in order to facilitate retrieval of the seismic sensor from the sea bottom.

The need for ROV for most node system operations makes the node handling less efficient and costly. Node surveys are therefore typically coarsely sampled in the receiver domain compared to OBS cable surveys. The cost/sampling issues limit the application of nodes to areas where OBS cable surveys are not an option for operational reasons, for example in the vicinity of infra-structures or in deep water.

The cable based methods described above have typically an interval of 25 m between sensors and allow for a much denser sampling of the underground in the inline direction and in less time compared to methods using separate nodes. However, the cable based systems have limitations when used in deeper waters due to high stress on the cable with its electrical and/or optical wiring as well as an increased probability for water leakage at the electrical terminations between the cable and each sensor house. It has proven to be difficult to operate large receiver spreads due to the operational difficulties mentioned above. As a result, much time is spent on shooting overlaps. In deep waters, cable based systems suffer from an increase in mechanical wear and tear and technical down time to be able to compete with node based systems.

The acquisition methods described above are not viable solutions for larger surveys. Despite their ability to provide better azimuth and offset coverage as well as S-wave data, the efficiency of these systems are too low compared to surface towed streamer seismic systems.

SUMMARY OF THE INVENTION

The present invention has been conceived to remedy or at least alleviate the above stated problems of the prior art.

In a first aspect the invention provides an ocean bottom seismic cable recording apparatus comprising: a plurality of seismic node casings, said casings being separated from each other by separate stress member sections having acoustic decoupling arrangements at each end connecting to said seismic node casings, and where each seismic node casing comprising an autonomous sensor capsule for sensing and recording seismic data, and wherein the autonomous sensor capsule is removable from said seismic node casing, and wherein each seismic node casing further comprising an inner compartment accommodating the autonomous sensor capsule.

The autonomous sensor capsule may be provided with an outer casing withstanding high water pressure. The autonomous sensor capsule may further comprise means for storing recorded data and a power supply unit. In an embodiment, the autonomous sensor capsule may further comprise three orthogonal geophones recording in x, y and z directions, a hydrophone, data recording unit and a battery and data storage unit. The battery and data storage unit may after data recording is completed be arranged in a docking station for unloading of data and recharging or replacement of batteries. In an embodiment at least two battery and data storage units are symmetrically positioned at opposite ends of the autonomous sensor capsule. The battery and data storage unit may also in another embodiment comprise a separate removable unit that may contain a real time clock and a CPU board with memory. The removable unit may be adapted to be placed in a docking station for comparing and adjusting the frequency of the real time clock to a reference frequency. Further, the removable unit may be adapted to be placed in a docking station, for programming and re-programming the CPU board and for downloading the data from the memory.

In an embodiment, the autonomous sensor capsule and the inner compartment may have corresponding shapes so as to provide a close fit of the sensor capsule within the seismic node casing. The seismic node casing may further comprise a quick locking and release mechanism for the autonomous sensor capsule.

The seismic node casings may have integrated flexible joints allowing bending of said node casings during spooling on reels. The seismic node casings may further have a shape and weight distribution to assure seismic coupling to sea floor sediments. The seismic node casings may have a low profile shape to allow an efficient spooling on reels during deployment and recovery. The seismic node casings may further comprise holes or openings allowing a hydrophone of the autonomous sensor capsule to be in direct contact with surrounding water. The seismic node casings may be removable from the decoupling devices. The stress member sections may be provided acting as weights in order to assure adequate seismic coupling of the seismic node casing to the seafloor. Additional weight members may be attached to the stress member sections or seismic node casings in order to stabilise said ocean bottom seismic cable recording apparatus during deployment. The ocean bottom seismic cable recording apparatus may be attached to a surface buoy by a lead-in wire after deployment. The seismic node casings with the acoustic decoupling devices may be attached via flexible connectors to the stress member sections such that they can freely rotate around their longitudinal axis preventing any bending or twist during deployment or recovery. The autonomous sensor capsule may further comprise means for measuring and recording an outside and/or inside temperature in a location at the sea bottom.

In a second aspect the invention provides a method for deployment of an ocean bottom seismic cable recording apparatus as defined above, wherein said method comprising: deploying said ocean bottom seismic cable recording apparatus at the sea bed from at least one reel arrangement on a vessel, and automatically or manually inserting the autonomous sensor capsules into the seismic node casings before said seismic node casings are deployed into the sea. In an embodiment, the autonomous sensor capsule is inserted automatically into the node casing by an industrial robot.

In a third aspect the invention provides a method for recovery of an ocean bottom seismic cable recording apparatus as defined above, wherein said method comprising spooling said ocean bottom seismic cable recording apparatus onto at least one reel arrangement, manually or automatically detaching the autonomous sensor capsules from the seismic node casings during spooling, and retrieving the seismic data from said autonomous sensor capsules.

In an embodiment, the method further comprises placing the sensor capsule in a docking station for unloading of data and recharging of batteries. Further, the battery and data storage unit may be removed from the sensor capsule, and the battery and data storage unit placed in a docking station for unloading of data and recharging of batteries. The removable unit may be placed in a docking station and the frequency of the real time clock compared with and adjusted to a reference frequency. In a further embodiment, the removable unit may be placed in a docking station, the CPU board programmed or re-programmed and data downloaded from flash memory. An industrial robot may be used for the automatically removal of the autonomous sensor capsule from the node casing. Industrial robots may also be used for managing the docking procedure for the battery and data storage unit, and for managing the docking procedure for the removable unit.

The apparatus provides a plurality of seismic node casings that are each connected at both ends via acoustic decoupling devices to individual stress member sections separating the seismic node casings. Each seismic node casing has an inner compartment containing an autonomous sensor capsule. The autonomous sensor capsule typically contains a set of three geophones arranged orthogonally to record seismic data in x,y,z direction, a hydrophone, digital recording instruments, means for storing recorded data and a power supply unit. The autonomous sensor capsule may in addition contain other types of sensors for measurements to be used in connection with geophysical exploration. The stress member sections and the acoustic decoupling devices are strictly mechanical devices and do not contain any electrical or optical wiring. After the ocean bottom seismic cable apparatus is recovered to the sea surface, the data is unloaded and the power supply unit is recharged.

The present invention will overcome many of the limitations that are inherent in existing systems, this since the cable, which is composed by individual stress member sections connecting the individual seismic node casings via acoustic decoupling devices, does not contain any electrical or optical wiring. This will allow the cable to be constructed to withstand much higher stress and mechanical wear. The cable laying vessel will thus be able to operate with increased speed during deployment and recovery. Since each seismic node casing comprises an autonomous sensor capsule for sensing and recording seismic data, i.e. no power and data transfer along the cable, there are no restrictions on the cable length. An autonomous sensor capsule that malfunctions will not influence the seismic data recorded by the other autonomous sensor capsules situated along the cable.

Furthermore, the smaller physical size of the node capsule relative to the node casing may also allow for a more efficient handling and storage onboard the vessel when detached from the node casing.

The proposed new apparatus will be well suited for conducting ocean bottom seismic surveys (OBS) at any water depth and the use of such an apparatus will significantly lower the costs compared to the existing systems for acquisition of OBS data.

BRIEF DESCRIPTION OF DRAWINGS

Example embodiments of the invention will now be described with reference to the followings drawings, where.

DETAILED DESCRIPTION

Example embodiments will be described with reference to the drawings. The same reference numerals are used for the same or similar features in all the drawings and throughout the description.

Figure 1:
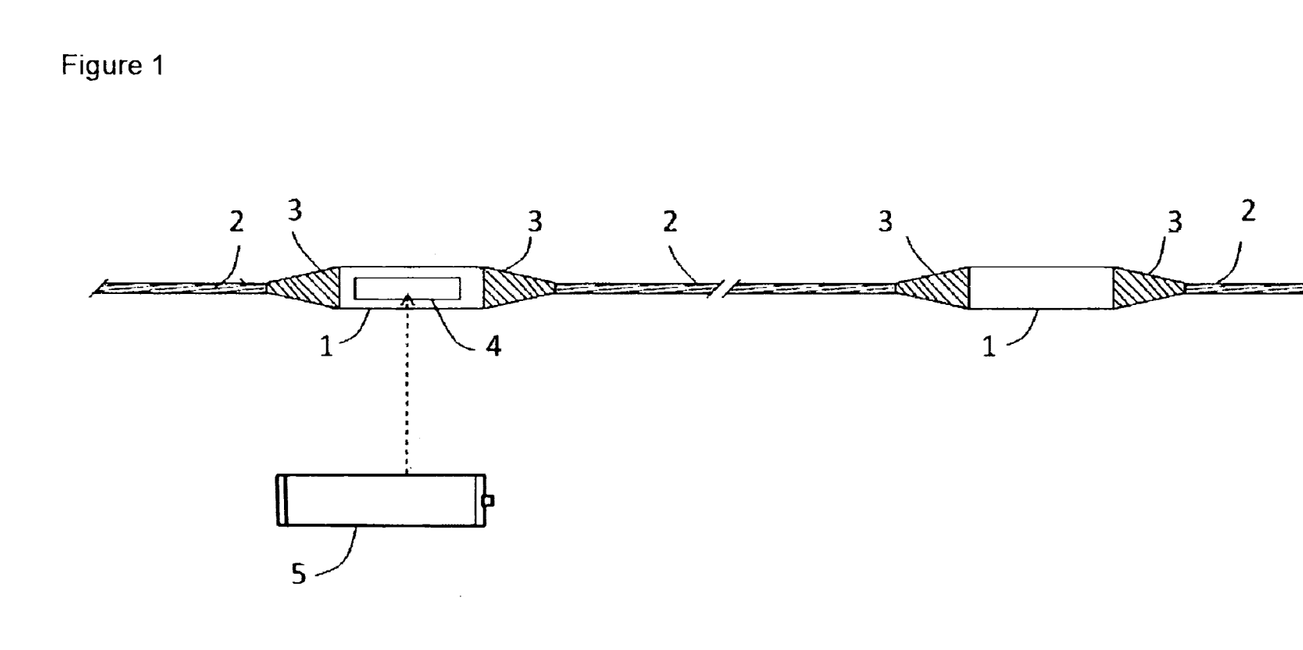
FIG. 1 illustrates an ocean bottom seismic recording cable apparatus according to an embodiment of the invention.

FIG. 1 illustrates a part of an autonomous ocean bottom seismic recording cable apparatus. A number of seismic node casings 1 are separated from each other by separate stress member sections 2. Each stress member section has acoustic decoupling arrangements 3 at each end for connection to the seismic node casings 1. FIG. 1 shows only two sensor nodes on the cable for illustration purposes. As shown in FIG. 1, the individual stress member sections 2 are attached via acoustic decoupling devices 3 to the seismic node casing 1. The individual stress member sections 2 and the acoustic decoupling devices 3 connect each sensor node casing 1 and form the recording cable. In FIG. 1, the seismic node casings are provided with an inner compartment 4 in which an autonomous sensor capsule 5 is placed. The autonomous sensor capsule is accommodated by the compartment 4. The sensor capsule and the inner compartment 4 may have corresponding shapes so as to provide a close fit of the sensor capsule within the seismic node casing. The sensor capsules are removable from the seismic node casings. The removable sensor capsules enables the cable, when onboard the vessel, to be spooled and stored on reels without containing any sensitive electronic components. Each sensor capsule can also be programmed and controlled for functionality prior to cable deployment. This will be explained in detail later.

Figure 2:
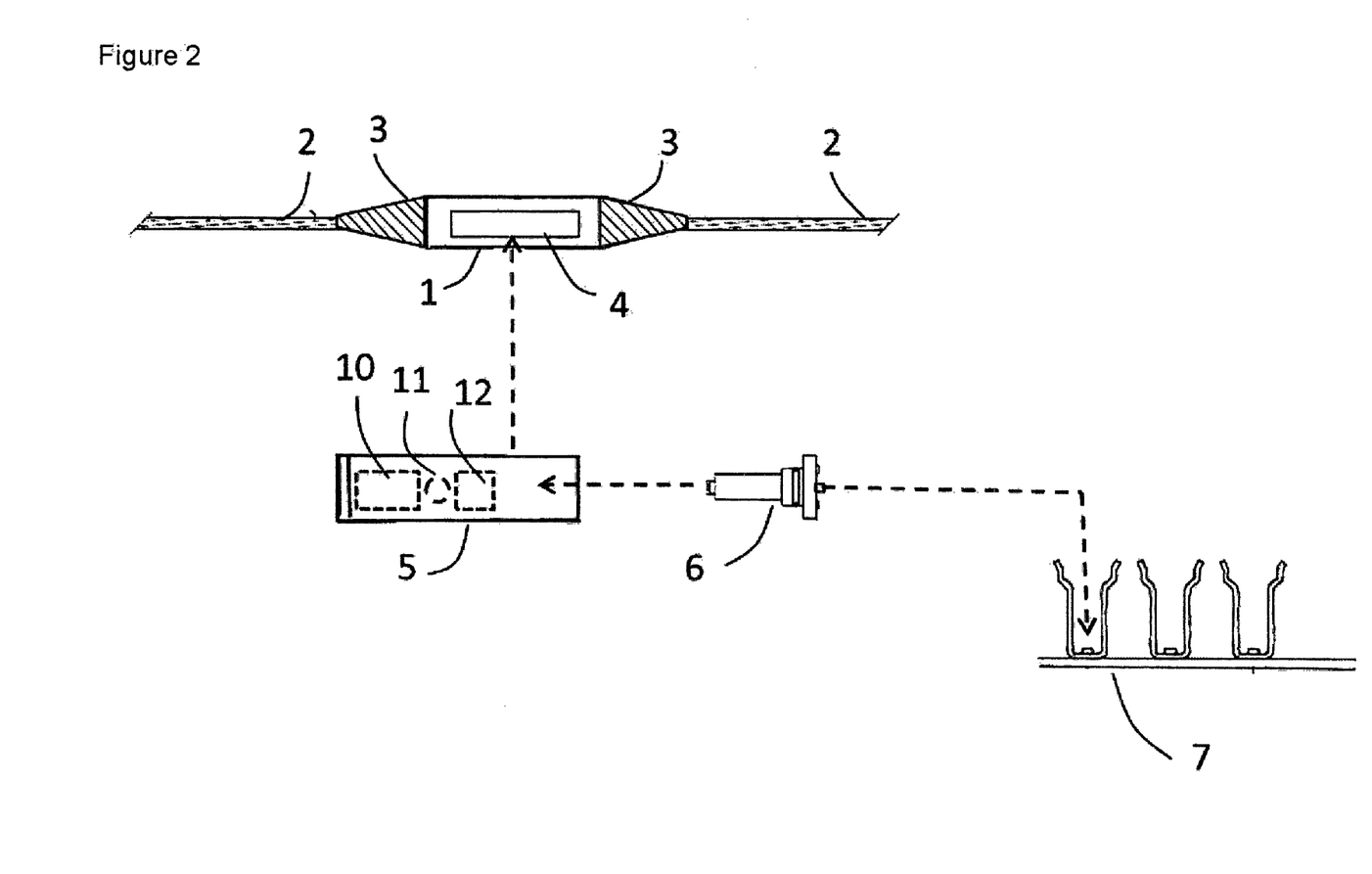
FIG. 2 illustrates in more detail a seismic node casing and the corresponding autonomous sensor capsule with detachable battery and data storage unit of an ocean bottom seismic recording cable apparatus according to an embodiment of the invention.

FIG. 2 illustrates in more detail a seismic node casing 1 from the apparatus in FIG. 1 and the autonomous sensor capsule 5. As illustrated in FIG. 2, each autonomous sensor capsule 5 can contain at least a set of three geophones 12 arranged orthogonally to record seismic data in x,y,z direction together with a hydrophone 11, digital recording instruments 10, pre-processing software and a battery and data storage unit 6.

The geophones in the autonomous sensor capsules may either be analog devices providing an electric signal proportional to the velocity of the ground or micro-electro mechanical systems (MEMS) devices, optical-electrical devices or any other device that output an electrical or optical signal proportional to ground displacement. The hydrophone may be a piezoelectric or optical transducer that generates an electrical or optical signal when subjected to a pressure change. The geophones may be arranged in other geometrical configurations than in x,y,z direction such as the Galperin geometry.

The battery and data storage unit 6 may be detachable from the autonomous sensor capsule. Seismic data may be retrieved from the battery and data storage unit 6 e.g. by placing the data storage unit in a docking station 7. When the battery and data storage units 6 are placed in the docking stations 7, the batteries can be replaced or re-charged at the same time. The retrieval of the seismic data from the sensor capsule may, in another embodiment, be performed directly from the autonomous sensor capsule by either wireless techniques such as for example optical or radio transmission or by attachment of an electrical cable. The hydrophone 11 can in one embodiment be located on the outside surface of the autonomous sensor capsule 5, or in another embodiment be placed inside the autonomous sensor capsule 5 attached to the outer wall of the autonomous sensor capsule 5. In the latter case the hydrophone 11 will record pressure changes in the water by sensing induced displacements of said outer wall. The autonomous sensor capsule 5 can in addition contain other types of sensors for measurements that can be used in connection with geophysical exploration such as sensors for dip and roll, salinity or temperature. The outer wall of the seismic node casing 1 may have a series of holes or openings 28 of any shape or size such that the autonomous sensor capsule 5 can be in direct contact with the surrounding water when placed at the sea bottom. The stress member sections 2 and the decoupling devices 3 are strictly mechanical devices and do not contain any electrical or optical wiring.

The stress member sections 2 may comprise a single steel wire or a plurality of steel wires arranged in parallel. In another embodiment the stress member sections 2 may be constructed of any other material or combination of materials with the right density and with properties to resist the tensional and torsional forces induced during deployment and retrieval. The stress member sections 2 are in both ends connected to acoustic decoupling devices 3 that will minimize or prevent any unwanted seismic noise to travel along the cable to contaminate the seismic data recorded by the geophones 12 or the hydrophone 11 located in the autonomous sensor capsule 5. The length of each stress member section 2 including the acoustic decoupling devices 3 is typically in the order of 12.5 m-50 m, but can in some situations be less or more. The actual length of the stress member sections 2 used for a particular cable will be determined depending on which lateral sampling interval that the particular cable system would be designed for. The attachment between the stress member sections 2 and the acoustic decoupling devices 3 can in one embodiment be fixed. In another embodiment the attachment between the stress member sections 2 and the acoustic decoupling devices 3 can be flexible such that one component of the cable can rotate in relation to another component. A plurality of stress member sections 2 with attached seismic node casings 1 and acoustic decoupling devices 3 can be connected together forming cable sections of approximately 150 to 500 meter length or longer. A plurality of such cable sections can be coupled together forming the complete autonomous seismic cable that can be of several kilometers of length. It is inherent in the present invention that there will be no limitation in to how long the autonomous seismic cable can be as compared with existing systems, where there are limitations due to the increased demand for electrical power to be transmitted to the sensors with increased cable lengths and the associated increase in number of sensors. The physical connection between the different cable sections can in one embodiment be fixed. In another embodiment the physical connection between the different cable sections can be flexible such that also different cable sections can rotate in relation to each other, thus preventing any twisting of the cable during deployment or recovery. Weight members could also, if needed, be attached to the stress member sections 2 at user selectable intervals for allowing operations in areas with strong ocean currents or when deploying the equipment in deep waters. Such weight members can be made for example of lead, steel or any other suitable material that have the right density. The weight members can preferably be shaped such that their form would minimize the additional forces that they could impose on the cable. Other modules to be attached could include navigation means for actually deciding the location of the cable and the individual seismic sensor casings 1, or galvanic anodes for corrosive protection.

The seismic node casings 1 with the autonomous sensor capsules 5 inserted, will record seismic data correspondingly to the sensor nodes that are integrated and used in ocean bottom cables of prior art. However, a difference concerning the coupling to the sea bottom is the use of the stress member sections 2 instead of the steel armored cable of prior art. This will, for the present invention, due to the higher density and smaller diameter of the stress member sections 2 improve the coupling to the seabed. The use of additional weight members attached to either the stress members 2 or the seismic node casings 1 may also improve the acoustic coupling to the sea bottom in some conditions.

Figure 4:
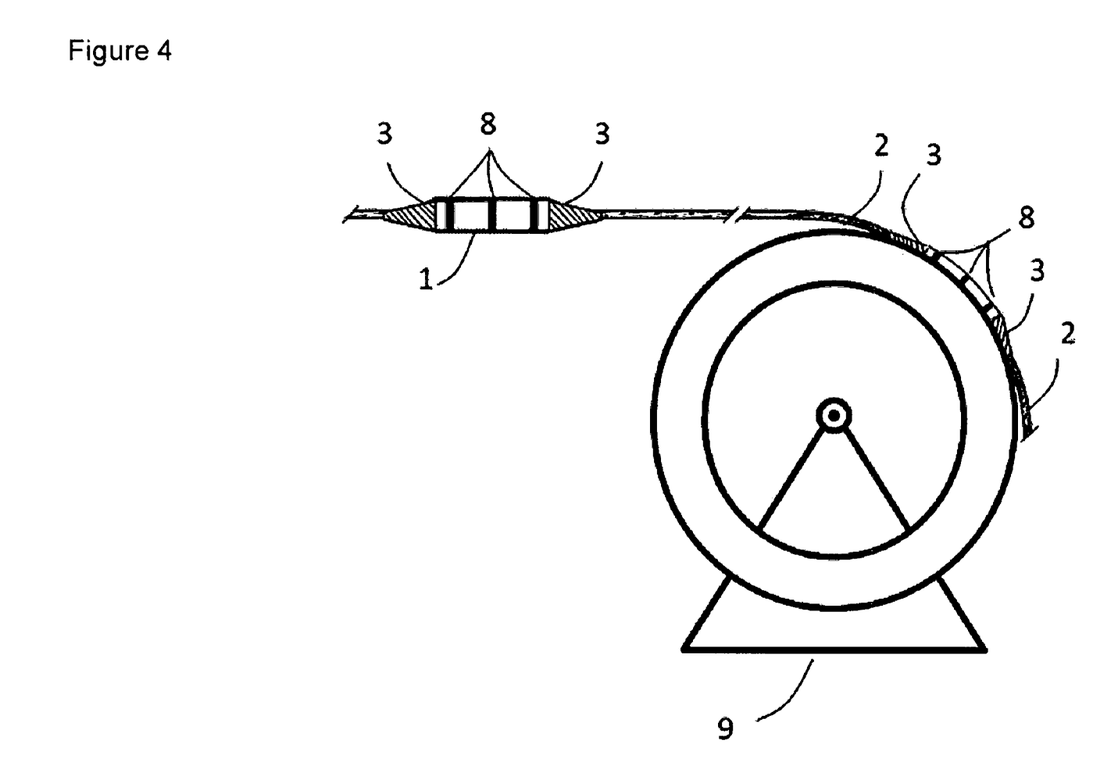
FIG. 4 illustrates a seismic node casing with flexible sections integrated in the body allowing for more efficient spooling on reels, according to an embodiment of the invention.

The seismic node casings 1 can in one embodiment as seen in FIG. 4 be manufactured of steel or another rigid material and be constructed with flexible joints 8 made of an elastic material such as rubber in order for allowing the seismic node casings 1, after the autonomous sensor capsule 5 is removed, to bend. The flexible joints 8 can alternatively be made of the same material as the seismic node casings 1 or another rigid material and be jointed allowing the different parts of the seismic node casings 1 to move in relation to each other. Seismic node casings 1 that can be bent will allow for a more efficient handling and spooling of the cable on reels 9 onboard the vessel, as indicated in FIG. 4. The present invention may, furthermore due to the use of flexible seismic node casings 1, small acoustic decoupling devices 3 and the stress member sections 2 with smaller diameter, allow for more cable on each reel 9 making it possible to handle and store longer cables onboard the vessel. When the autonomous sensor capsules 5 are inserted inside the seismic node casings 1 during deployment, the seismic node casings 1 will again become non-flexible and rigid. Furthermore, the existing OBS systems are often exposed to large forces due to the actual weight of the cable itself and to the larger diameter of the armored cable which can, due to currents in the sea water, create high forces leading to damages to the cable. These types of forces will decrease with the present invention since the smaller diameter of the stress member sections 2 will generate less drag on the cable.

As shown in FIG. 1 and FIG. 2 the acoustic decoupling devices 3 are attached to both ends of each seismic node casing 1 and separates them from the stress member sections 2. As the seismic sensor capsules are autonomous, there are no continuous electrical/optical transmission lines throughout the entire length of the resulting autonomous seismic cable recording apparatus. This simplifies the connection arrangement between the stress member sections and the seismic node casings, as the connection need not be water tight and rigid in order to avoid transmission line breakage and node failure. The acoustic decoupling devices 3 can be of much smaller dimensions than those used in prior art. This, since in prior art these devices normally have a secondary function as bend restrictors which is necessary in order to protect the cables of prior art from being bent during deployment and recovery, which can cause it to break or cause leakage of water into the cable and its sensors. The acoustic decoupling devices may in another embodiment include flexible elements in order to make the cable more resilient during handling and spooling onboard the vessel.

Figure 3:
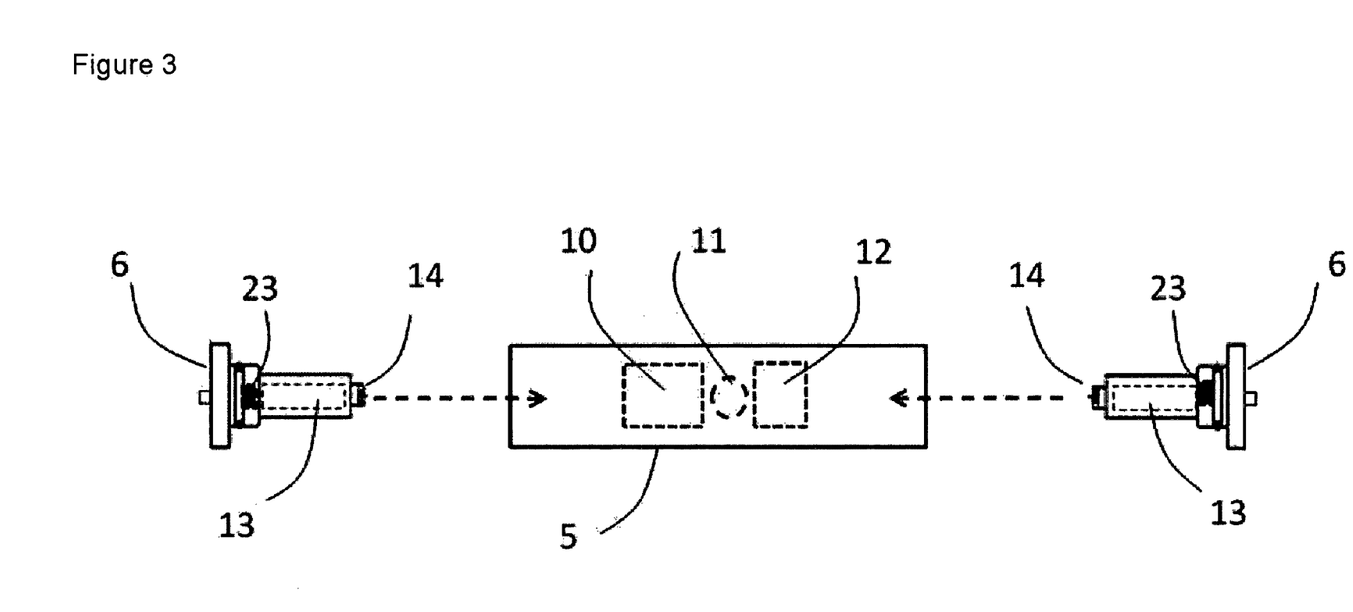
FIG. 3 illustrates an autonomous sensor capsule with two symmetrically arranged detachable battery and data storage units according to an embodiment of the invention.

The autonomous sensor capsules 5 can be made of titanium or steel or any other material with similar properties. The autonomous sensor capsules 5 can be constructed with one cylindrical inner compartment as shown in FIG. 2, or with a plurality of cylindrical inner compartments that may be interconnected. The autonomous sensor capsules 5 are designed to withstand high water pressure at the sea bottom. Each autonomous sensor capsule 5 can have either one opening at one end for inserting and removing the battery and data storage unit 6 as illustrated in FIG. 2 or as shown in FIG. 3, two openings, in which one opening is located in each respective short end of the tube formed autonomous sensor capsule 5.

Figure 8:
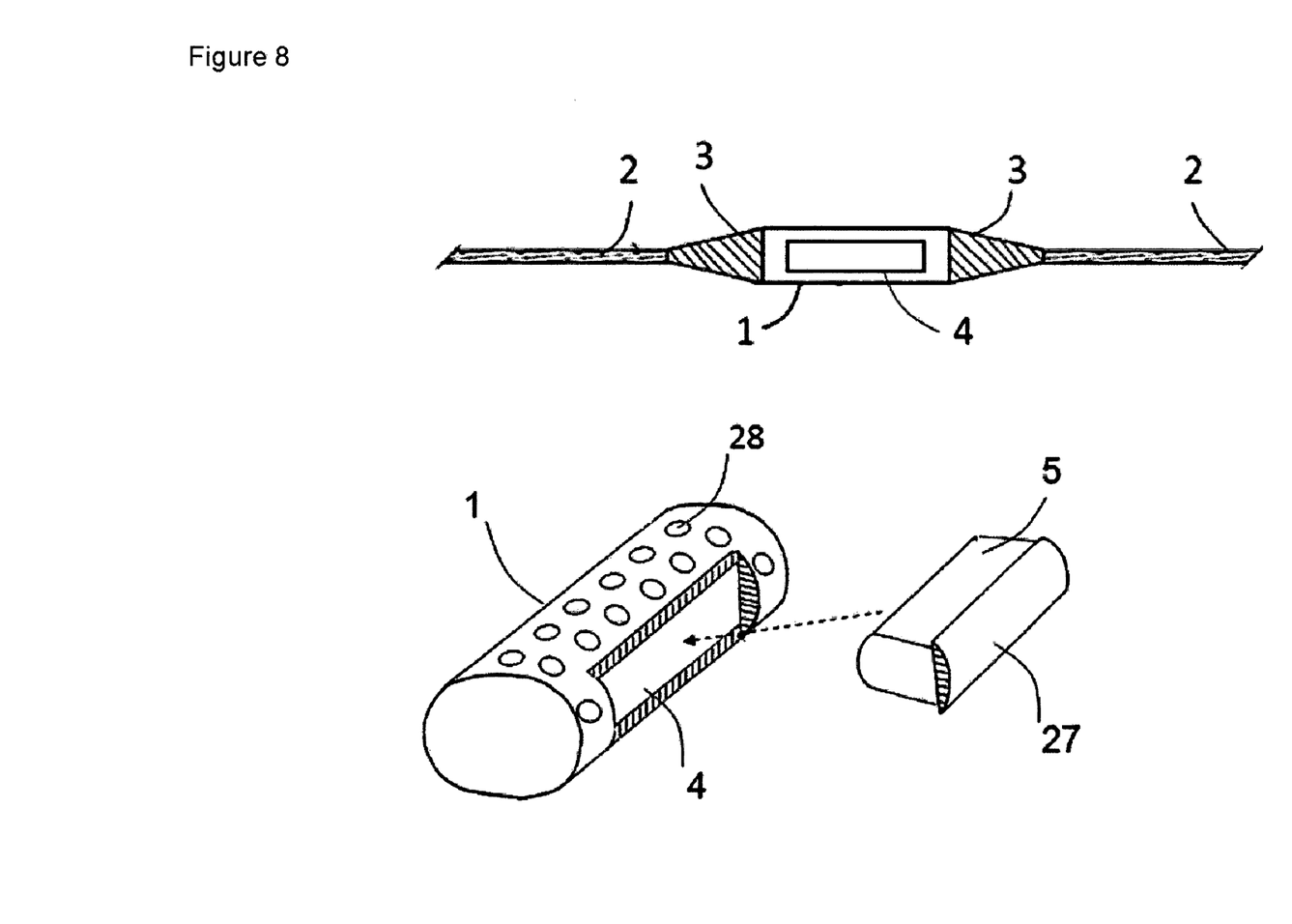
FIG. 8 illustrates a seismic node casing with inner compartment together with an autonomous sensor capsule that has a corresponding outer shape according to an embodiment of the invention.

As depicted in FIG. 8, at least a part of the autonomous sensor capsule 5 surface may have an outer shape that corresponds to the outer shape of the seismic node casing 1. When the autonomous sensor capsule 5 is inserted in the inner compartment 4 of the seismic node casing, the autonomous sensor capsule surface part 27 is integral with the outer surface of the seismic node casing 1. A complete outer surface of the node casing 1 is thus formed with the sensor capsule inserted. The autonomous sensor capsule 5 surface part may also function as its own cover when inserted in the seismic node casing 1. The outer surface of the seismic node casing with inserted autonomous sensor capsule 5 may be symmetrical about a longitudinal plane of the seismic node casing. The longitudinal cross section of the seismic node casing is in FIG. 8 elliptic, but other geometrical forms or combinations of geometrical forms may also be envisaged. A smooth outer surface of the seismic node casing may provide improved hydrodynamic behaviour and therefore minimise the tensional and rotational forces imposed during the deployment and recovery of the cable. A smooth and even surface will also ensure good seismic coupling to the seafloor sediments.

As in the embodiment in FIGS. 1, 2 and 8, the autonomous sensor capsule 5 has an outer shape to provide a close fit with the inner space/compartment 4 of the seismic node. The close fit ensures that the geophones inside the autonomous sensor capsule 5 will be able to correctly sense and record the seismic waves transferred from the seabed sediments via the seismic node casing.

The autonomous sensor capsule and the inner space 4 are designed to enable easy removal and insertion of the autonomous sensor capsule in the inner space 4 of the seismic node. At the same time, it should be ensured that the autonomous sensor capsule is firmly secured and fixed into the correct position in the inner space 4 during operation of the ocean bottom seismic cable recording apparatus. In an embodiment this may be accomplished by a separate quick locking and release mechanism incorporated in the seismic node casing 1 (not shown in FIG. 8). The quick locking and release mechanism may comprise a spring loaded bolt, sprint or tap or any similar arrangement. Furthermore, this locking and release mechanism also ensures that the process of insertion and removal of each autonomous sensor capsule 5 can be performed automatically and be accomplished in a short time.

As depicted in FIG. 3 the battery and data storage unit 6 may include a connector device with a watertight seal that contain a battery pack 13, a memory e.g. a flash memory or any other suitable memory for data storage 23 and an electrical connection socket 14. The battery and data storage unit 6 can have batteries 13 of rechargeable type or of primary type. In another embodiment as shown in FIG. 3 two battery and data storage units 6 could be used; one in each end of the autonomous sensor capsule 2. This would allow for a more uniform distribution of weight of the seismic node casing 1 that can improve the acoustic coupling to the ground. Another benefit with such an arrangement can be that if the survey is of a short duration, then only one of the batteries 13 would be supplying the electrical power for the seismic data recording, and the other battery 13 would act as a backup. The same principle for backup will also apply for the flash memory data storage 23.

Figure 7:
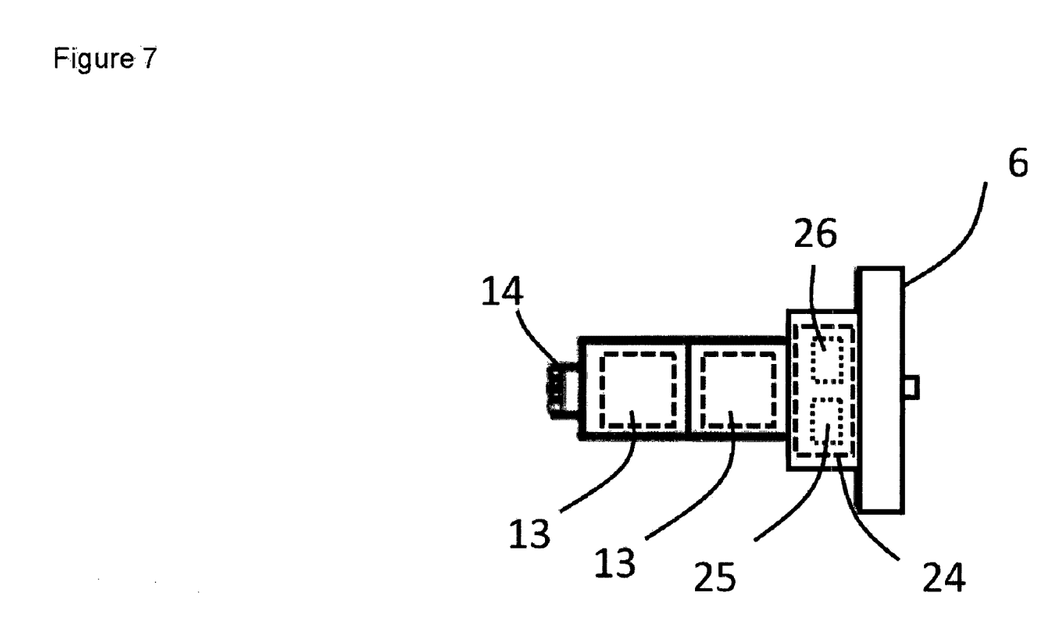
FIG. 7 illustrates a battery and data storage unit with a separate removable unit comprising a real time clock and a CPU board with memory according to an embodiment of the invention.

As depicted in FIG. 7 the battery and data storage unit 6, shown with connection socket 27, may in a further embodiment encompass a separate removable unit 24. The separate removable unit 24 may comprise a real time clock 25 and a CPU board 26. The real time clock may contain a quartz oscillator such as for example an ocxo, mcxo, tcxo or vctcxo of prior art or any other type of oscillator that provide the required frequency stability. The real time clock ensures synchronization and control of each autonomous sensor capsule enabling detection of the seismic signals with high accuracy and timeliness. The CPU board may also include a memory (e.g. a flash memory) for storage of recorded data. The CPU board further provides a processing unit that in a timely manner can control all tasks needed to complete the overall system functionality. These tasks may include setting up registers with data, reading data from registers, to trigger events at the correct time and in correct order and handle communication between different units in the sensor capsule or between the separate removable unit 24 and a docking station. The CPU board may also include means for performing certain steps of pre-processing of the recorded seismic data such as for example re-sampling or filtering. As shown in FIG. 7 the battery and data storage unit 6 may also contain two separate batteries 13. To ensure redundancy of the system only one battery at each time may supply the electrical power for the seismic recording and the other battery 13 would act as a backup.

When the cable is deployed from the vessel, the autonomous sensor capsules 5 are first checked for functionality and thereafter inserted into the inner compartments 4 of the seismic node casings 1 before the cable is paid out overboard.

Figure 5:
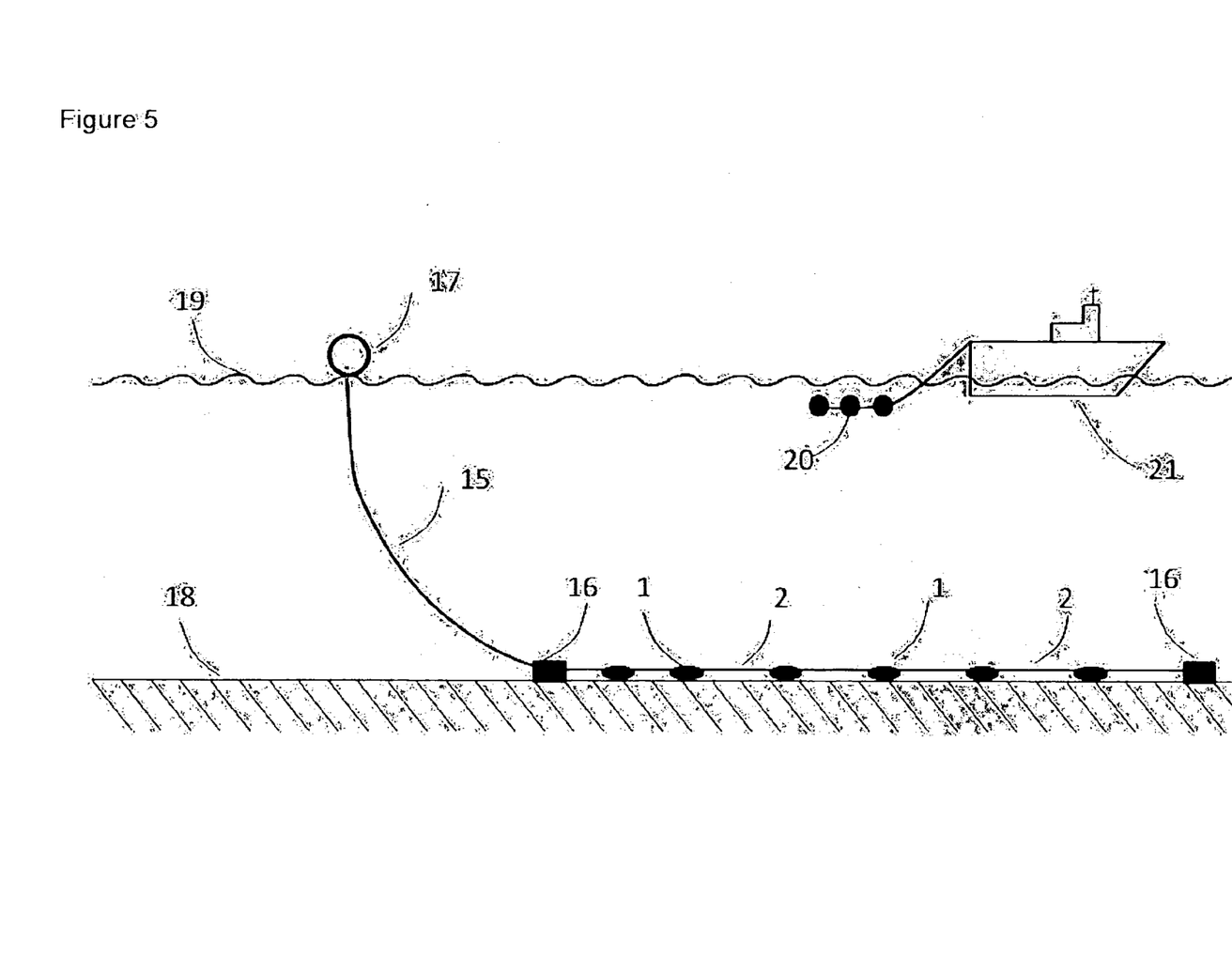
FIG. 5 illustrates data acquisition with one ocean bottom seismic cable apparatus deployed at the sea bottom, attached via a lead-in wire up to a sea surface buoy and a vessel towing a seismic source for generating the seismic signals, according to an embodiment of the invention.

FIG. 5 illustrates how an autonomous cable has been deployed on the sea bottom 18. Shown is also a standard seismic source vessel 21 that can be used for generating a seismic signal by for example a traditional air gun array 20. After the shooting vessel has finished firing, the autonomous cable is recovered by a spooling arrangement located on the deck of the cable laying vessel. This spooling arrangement may be the same as the spooling arrangement 9 in FIG. 4 for paying out the seismic cable. The autonomous sensor capsules can then be automatically or manually detached from the seismic node casings on the vessel deck during spooling, transported to a separate space onboard the vessel, opened up and the seismic data retrieved from the battery and data storage unit 6 e.g. by placing the battery and data storage unit 6 in a docking station 7. Alternatively, the separate removable unit 24 may be disconnected from the battery and data storage unit 6 and the removable unit 24 placed in the docking station 7. When the battery and data storage unit 6 or the separate removable unit 24 is placed in the docking station 7, the batteries may be replaced or re-charged at the same time. The removable unit 24 is adapted to be placed in a docking station 7, for programming and re-programming the CPU board 26 and for downloading the data from the memory 23. When the removable unit 24 is placed in the docking station 7, the frequency of the real time clock 25 may also be compared and adjusted to a reference frequency. Synchronization may also be performed after deployment on the ocean floor.

In another embodiment, the retrieval of data, programming and re-programming and synchronization may be performed directly to and from the autonomous sensor capsule by either wireless techniques such as for example optical or radio transmission or by an connecting electrical cable.

The autonomous sensor capsules 5 can, in another embodiment, onboard the seismic vessel, be inserted, removed and/or transported to and from the seismic node casings by one or a plurality of automatically controlled, reprogrammable, multipurpose manipulators programmable in three or more axes, e.g. industrial robots. Also, the procedure of docking the battery and data storage unit 6 and docking of the removable unit 24 may be managed by an industrial robot. The entire process may thus be automated facilitating handling of large spreads with large amounts of sensor capsules saving costs and time.

Figure 6:
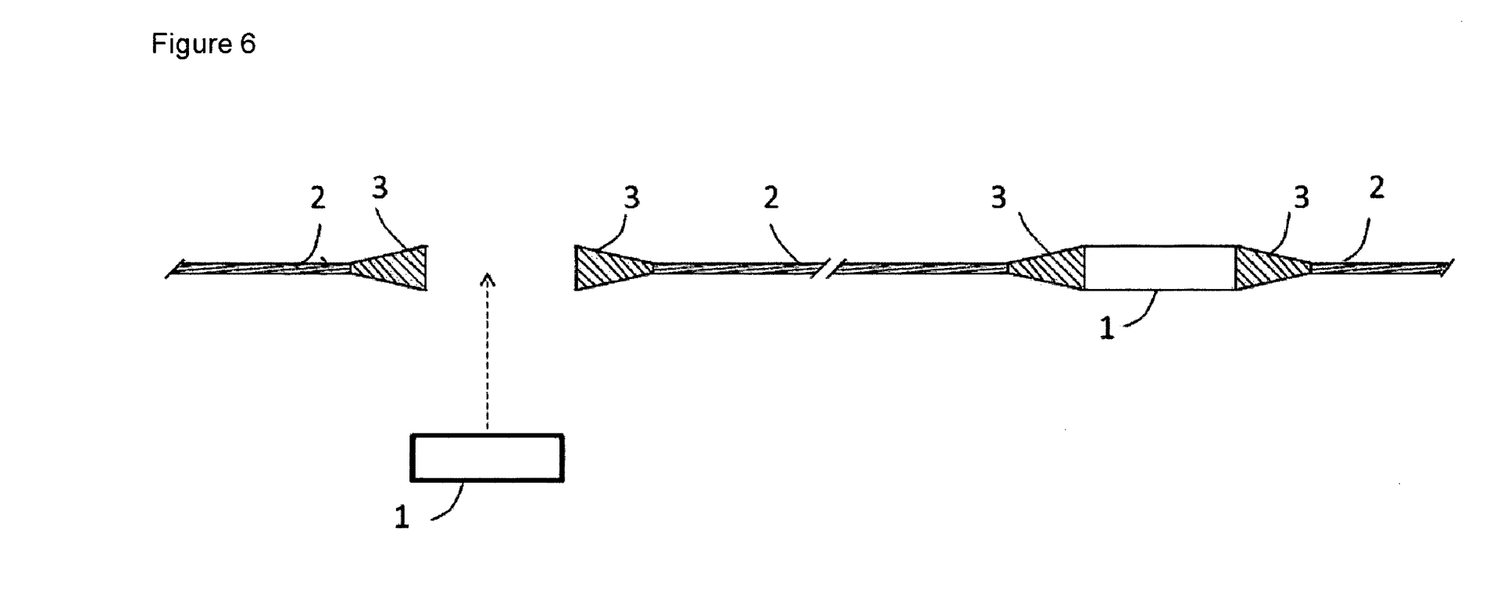
FIG. 6 illustrates an ocean bottom seismic recording cable apparatus with detachable seismic node casing according to an embodiment of the invention.

An alternative embodiment of the seismic node casings 1 is illustrated in FIG. 6. In FIG. 6 the seismic node casings 1 themselves are detachable from the acoustic decoupling devices 3. The autonomous sensor capsules 5 may be integrated with, and possibly embedded in, the seismic node casings. When retrieving the autonomous seismic cable from the seabed, the seismic node casings may be automatically or manually detached from the decoupling devices 3 and the seismic data subsequently retrieved from the autonomous sensor capsules 5, said sensor capsules either being removed or still integrated in the sensor casing, for example by data transmission performed in docking stations as explained earlier.

As illustrated in FIG. 5 the autonomous cable with its node casings 1, with inserted autonomous sensor capsules (not shown in FIG. 5) and connected via acoustic decoupling devices (not shown in FIG. 5) to stress member sections 2 has been fully deployed at the seabed. At both ends an anchorage weight 16 can be attached in order to secure the position of the cable. A lead in wire 15 can be attached to one end of the autonomous cable leading up to the sea surface 19 and there be attached to a buoy 17. A plurality of autonomous cables could in this way be deployed at different locations at the sea bottom 18 in order to simultaneously record seismic data during shooting sessions.

During data acquisition the environmental noise may be recorded. Since the present invention records seismic data in an autonomous mode, this noise may be recorded by a separate data acquisition system with real time data transfer to one of the vessels for quality control purposes. Several options for environmental noise recording are feasible. One option is to record the data with a short seismic streamer towed behind the source vessel. The streamer is typically equipped with hydrophones which sense the environmental noise. The data is transferred to the recording system on the source boat through the streamer. Analysis of the data can then be performed on the source boat. Another option is to deploy a short traditional ocean bottom cable with just a few sensor modules. The sensor modules are equipped with three geophones recording x, y and z components and a hydrophone. The data is transferred through a lead-in cable to a recording buoy and then transferred by radio to one of the vessels for analysis. Alternatively, hydrophones can be mounted on the lead-in cable and the geophones left out. These data recording systems can either be deployed independently of the present invention or deployed together with the present invention and utilize the present invention's lead-in wire 15. In this event the buoy 17 has to be replaced with a buoy containing recording system and equipment for radio transfer of the environmental data.

The autonomous seismic acquisition system allows for having very long recording cables deployed since the stress member sections 2, the acoustic decoupling devices 3 and the seismic node casings 1 do not contain any electrical or optical wiring making it very unproblematic to spool onto standard spooling reels 9. This since there are no electronic devices or sensors or other sensitive units attached to the cable that could be sensitive to the associated bending, stress and forces when spooling and handling the cable onboard the vessel.

This seismic acquisition system is particularly suited for so-called ocean bottom seismic surveys (OBS) at any water depth and the use of the present invention can significantly lower the acquisition costs when compared to prior art.

The present invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. An ocean bottom seismic cable recording apparatus comprising:
a plurality of seismic node casings, said node casings being separated from each other by separate stress member sections, each stress member section having acoustic decoupling arrangements at each end connecting to said seismic node casings, and where each seismic node casing comprising an autonomous sensor capsule for sensing and recording seismic data, and wherein the autonomous sensor capsule is removable from said seismic node casing, and wherein each seismic node casing further comprising an inner compartment accommodating the autonomous sensor capsule.

2. The recording apparatus of claim 1, wherein the autonomous sensor capsule have an outer casing withstanding high water pressure.

3. The recording apparatus of claim 1, wherein the autonomous sensor capsule further comprising means for storing recorded data and a power supply unit.

4. The recording apparatus of claim 1, wherein the autonomous sensor capsule comprises three orthogonal geophones recording in x, y and z directions, a hydrophone, data recording unit and a battery and data storage unit.

5. The recording apparatus of claim 4, wherein at least two battery and data storage units are symmetrically positioned at opposite ends of the autonomous sensor capsule.

6. The recording apparatus of claim 4, wherein the battery and data storage unit after data recording is completed is placed in a docking station for unloading of data and recharging of batteries.

7. The recording apparatus of claim 4, wherein the battery and data storage unit further comprises a removable unit, said removable unit comprising a real time clock, a CPU board and a memory.

8. The recording apparatus of claim 7, wherein the removable unit is adapted to be placed in a docking station for comparing and adjusting the frequency of the real time clock to a reference frequency.

9. The recording apparatus of claim 7, wherein the removable unit is adapted to be placed in a docking station, for programming and re-programming the CPU board and for downloading the data from the memory.

10. The recording apparatus of claim 1, wherein the autonomous sensor capsule and the inner compartment have corresponding shapes so as to provide a close fit of the sensor capsule within the seismic node casing.

11. The recording apparatus of claim 1, wherein the seismic node casing comprises a quick locking and release mechanism for the autonomous sensor capsule.

12. The recording apparatus of claim 1, wherein the seismic node casings have a shape and weight distribution to assure seismic coupling to seafloor sediments.

13. The recording apparatus of claim 1, wherein the seismic node casings have a low profile shape to allow an effective spooling on reels during deployment and recovery.

14. The recording apparatus of claim 1, wherein the seismic node casings comprising holes or openings allowing a hydrophone of the autonomous sensor capsule to be in direct contact with surrounding water.

15. The recording apparatus of claim 1, wherein the seismic node casings having integrated flexible joints allowing bending of said node casings during spooling on reels.

16. The recording apparatus of claim 1, wherein the seismic node casings are disconnectable from the acoustic decoupling devices.

17. The recording apparatus of claim 1, wherein the stress member sections are acting as weights in order to assure adequate seismic coupling of the seismic node casing to the seafloor.

18. The recording apparatus of claim 1, comprising additional weight members attachable to the stress member sections or seismic node casings in order to stabilise the ocean bottom seismic cable recording apparatus during deployment.

19. The recording apparatus of claim 1, wherein the seismic node casings with the acoustic decoupling devises are attached via flexible connectors to the stress member sections such that they can freely rotate around their longitudinal axis preventing any bending or twist during deployment or recovery.

20. The recording apparatus of claim 1, wherein the autonomous sensor capsule comprises means for measuring and recording an outside and/or inside temperature in a location at the sea bottom.

21. The recording apparatus of claim 1, wherein the ocean bottom seismic cable recording apparatus is attached to a surface buoy by a lead-in wire after deployment.

22. Method for deployment of an ocean bottom seismic cable recording apparatus as defined in claim 1, wherein said method comprising:
 deploying said ocean bottom seismic cable recording apparatus at the sea bed from at least one reel arrangement on a vessel, and
 automatically or manually inserting the autonomous sensor capsules into the seismic node casings before said seismic node casings are deployed into the sea.

23. Method of claim 22, wherein the autonomous sensor capsule is inserted automatically into the node casing by an industrial robot.

24. Method for recovery of an ocean bottom seismic cable recording apparatus as defined in claim 1, wherein said method comprising:
 spooling said ocean bottom seismic cable recording apparatus onto at least one reel arrangement,
 manually or automatically removing the autonomous sensor capsules from the seismic node casings during spooling, and
 retrieving the seismic data from said autonomous sensor capsules.

25. Method of claim 24, further comprising placing the sensor capsule in a docking station for unloading of data and recharging of batteries.

26. Method of claim 25, wherein the procedure of docking the battery and data storage unit is managed by an industrial robot.

27. Method of claim 24, further comprising removing the battery and data storage unit from the sensor capsule, and placing the battery and data storage unit in a docking station for unloading of data and recharging of batteries.

28. Method of claim 24, wherein the removable unit is placed in a docking station and the frequency of the real time clock are compared with and adjusted to a reference frequency.

29. Method of claim 28, wherein the procedure of docking the removable unit is managed by an industrial robot.

30. Method of claim 24, wherein the removable unit is placed in a docking station, the CPU board programmed or re-programmed and data downloaded from memory.

31. Method of claim 24, wherein the autonomous sensor capsule is removed automatically from the node casing by an industrial robot.

* * * * *